United States Patent [19]

Miyashita et al.

[11] Patent Number: 5,236,483

[45] Date of Patent: Aug. 17, 1993

[54] METHOD OF PREPARING SILICA GLASS

[75] Inventors: Satoru Miyashita; Sadao Kanbe; Motoyuki Toki; Tetsuhiko Takeuchi; Hirohito Kitabayashi, all of Nagano, Japan

[73] Assignee: Seiko Epson Corporation, Tokyo, Japan

[21] Appl. No.: 969,540

[22] Filed: Oct. 30, 1992

Related U.S. Application Data

[63] Continuation of Ser. No. 563,874, Aug. 6, 1990, abandoned, which is a continuation of Ser. No. 263,969, Oct. 26, 1988, abandoned, which is a continuation of Ser. No. 884,933, Jul. 14, 1986, abandoned.

[30] Foreign Application Priority Data

Jul. 16, 1985 [JP] Japan ................................. 60-156669

[51] Int. Cl.$^5$ ............................................. C03B 5/225
[52] U.S. Cl. ........................................ 65/17; 65/3.11; 65/18.1; 65/24; 65/26; 65/111; 65/136; 65/374.13; 65/374.15; 65/901; 264/66; 501/12
[58] Field of Search ................... 65/3.11, 17, 18.1, 24, 65/26, 111, 117, 136, 374.13, 374.15, 901; 264/56, 66; 501/12

[56] References Cited

U.S. PATENT DOCUMENTS

| | | | |
|---|---|---|---|
| 1,645,080 | 11/1927 | Watson | 65/136 X |
| 2,470,461 | 5/1949 | Black | 65/24 |
| 2,795,084 | 6/1957 | Littleton | 65/24 |
| 3,265,478 | 8/1966 | Slayter | 65/136 X |
| 3,283,044 | 11/1966 | Brown | 65/24 |
| 4,032,315 | 6/1977 | van der Steen | 65/136 X |
| 4,042,361 | 8/1977 | Bihuniak | 65/901 |
| 4,317,668 | 3/1982 | Susa | 65/901 |
| 4,372,767 | 2/1983 | Maklad | 65/136 X |
| 4,417,910 | 11/1983 | Passaret | 65/901 |
| 4,478,626 | 10/1984 | Miritoki | 65/18.1 |
| 4,547,644 | 10/1985 | Blair | 65/374.13 |
| 4,608,473 | 8/1986 | Paek | 65/374.13 |
| 4,666,495 | 5/1987 | Kreutzer | 65/374.15 |

FOREIGN PATENT DOCUMENTS

| | | |
|---|---|---|
| 0107943 | 9/1984 | European Pat. Off. . |
| 2008653 | 9/1970 | Fed. Rep. of Germany . |
| 2818550 | 3/1979 | Fed. Rep. of Germany ... 65/374.15 |
| 3604529 | 8/1986 | Fed. Rep. of Germany . |
| 52-06709 | 2/1977 | Japan ................................. 65/24 |
| 52-68222 | 6/1977 | Japan ........................... 65/374.15 |
| 57-169705 | 10/1982 | Japan ............................... 65/3.11 |
| WO78/00001 | 10/1978 | PCT Int'l Appl. . |
| 614032 | 7/1978 | U.S.S.R. ......................... 65/374.15 |
| 733978 | 7/1955 | United Kingdom ................. 65/136 |
| 288319 | 8/1965 | United Kingdom ............ 65/374.13 |
| 1176393 | 1/1970 | United Kingdom . |
| 1358557 | 7/1974 | United Kingdom . |
| 1523595 | 9/1978 | United Kingdom ............ 65/374.15 |
| 2165233 | 4/1986 | United Kingdom . |

OTHER PUBLICATIONS

Matsuyama, Iwao; Ceramic Bulletin, vol. 63, No. 11 (1984), pp. 1408–1411.

*Primary Examiner*—Robert L. Lindsay
*Attorney, Agent, or Firm*—Blum Kaplan

[57] ABSTRACT

A method for preparing a silica glass article of improved purity is provided. The article is prepared by a sol-gel method and is then heat treated to a selected temperature between about 1500° and 2200° C. and maintained at the selected temperature for a predetermined period of time sufficient to remove silica crystals, inclusions, microcracks and bubbles. The resulting silica glass articles have improved purity and can be used as photomask substrates or as preforms for optical fibers.

25 Claims, No Drawings

METHOD OF PREPARING SILICA GLASS

This application is a continuation of application Ser. No. 07/563,874 filed on Aug. 6, 1990 for METHOD OF PREPARING SILICA GLASS which is a continuation of application Ser. No. 07/263,969 filed Oct. 26, 1988, which is a continuation of application Ser. No. 07/884,933 filed Jul. 14, 1986, all now abandoned.

BACKGROUND OF THE INVENTION

This invention relates to an improved sol-gel method for preparing silica glass and, in particular, to an improved sol-gel method for preparing high quality silica glass.

Silica glass is useful for many purposes, including glass wafers, semiconductor industrial material, optical material, preforms for optical fibers, support tubes and photomask substrates. Accordingly, the demand for silica glass is expected to expand significantly in coming years.

The sol-gel method has been used as a method for preparing inexpensive silica glass and various sol-gel methods are known. Such methods are described, for example, in the "Journal of Non-Crystalline Solids", Vol. 37, No. 191 (1980) by Nogami et al, "Journal of Non-Crystalline Solids", Vol. 47, No. 435 (1982) by Rabinovitch et al, U.S. patent application Ser. No. 642,606 filed on Aug. 20, 1984 by Toki et al and U.S. patent application Ser. No. 826,527, filed on Feb. 6, 1986 by Matsuo et al.

The differences between these methods arise from differences in the components of the sol solution, which is the main starting material. The methods can be classified into four groups as follows:

1. The sol solution is prepared by hydrolyzing a mixture of a silicon alkoxide, water, alcohol and an appropriate catalyst such as hydrochloric acid, ammonia and the like. This is the method of Nogami et al;

2. The sol solution is prepared by mixing a solution of a silicon alkoxide hydrolyzed with an acid reagent and a solution containing fine particle silica obtained by hydrolyzing a silicon alkoxide with a basic reagent at a predetermined mixing ratio. This is the method of Matsuo et al;

3. The sol solution is prepared by mixing a solution of a silicon alkoxide hydrolyzed with an acid reagent and ultrafine particle silica at a predetermined mixing ratio. This is the method of Toki et al; and 4. The sol solution is prepared by diffusing ultrafine particle silica in water or an organic solvent at a predetermined ratio. This is the method of Rabinovitch et al.

The sol solutions prepared by each of the above methods are gelled in a container of the desired shape and the resulting dry gel is sintered to yield a silica glass article. Each of the methods has distinct advantages and disadvantages. The features of each method are shown in the following table.

TABLE 1

|  | Nogami | Matsuo | Toki | Rabinovitch |
|---|---|---|---|---|
| purity of the silica glass | ⊚ | ⊚ | Δ | Δ |
| cost of raw material | ○ | Δ | ○ | ⊚ |
| yield | X | ⊚ | ⊚ | ○ |
| size of article | X | ⊚ | ⊚ | Δ |
| suitability for | X | Δ | ⊚ | ○ |

TABLE 1-continued

|  | Nogami | Matsuo | Toki | Rabinovitch |
|---|---|---|---|---|
| mass-production |  |  |  |  |

⊚ = excellent
○ = very good
Δ = satisfactory
X = unsatisfactory

The method of Toki et al is the best from the point of view of productivity. The method of Matsuo et al is the best in terms of physical properties and purity of the resulting glass.

When any of the sol solutions described above are used as a starting material and are dried and sintered to yield a silica glass article, inclusions occur in the resulting article. In order to enhance the quality of the glass, Matsuo et al has succeeded in removing inclusions larger than a few microns by performing the sol-gel procedure for making a silica glass article in a clean environment, irradiating the sol solution with supersonic waves in order to improve the dispersion properties, and filtering and centrifugally separating the sol solution. Matsuo et al have also succeeded in preventing bubbling by closing the pores in the dry gel by sintering the dry gel in a helium atmosphere or under reduced pressure.

According to the method of Matsuo et al, the inclusions in the resulting silica glass articles are reduced remarkably. However, the resulting silica glass articles still include silica crystals, some inclusions, microcracks and bubbles. For this reason, the presently available silica glass cannot be used in fields where extremely high quality is required, specifically for photomask substrates and preforms for optical fibers.

Accordingly, it is desirable to provide an improved method of making silica glass articles which are free of silica crystals, inclusions, microcracks and bubbles which will overcome the shortcomings of the prior art.

SUMMARY OF THE INVENTION

An improved sol-gel method for preparing a silica glass article is provided. The method includes the steps of preparing a silica containing sol solution, gelling the sol solution to a wet gel, drying the wet gel to a dry gel and closing pores in the dry gel. The silica glass article is heated to a selected temperature in the range between about 1500° and 2200° C. and maintained at the selected temperature for a predetermined period of time. The heat treatment step raises the temperature of the silica glass article to a temperature higher than that which is normally encountered when silica glass articles are prepared using sol-gel methods. Inclusions, microcracks and bubbles are dissolved at the elevated temperature and silica glass articles which have no internal defects are obtained.

It is, therefore, an object of the invention to provide an improved sol-gel method for preparing silica glass articles.

It is a further object of the invention to provide a method for preparing silica glass articles which have no internal defects to be used as photomask substrates and preforms for optical fibers by heat treating the article following preparation by a sol-gel method.

It is another object of the invention to provide silica glass articles which have no internal defects.

Still other objects and advantages or the invention will in part be obvious and will in part be apparent from the specification.

The invention accordingly comprises the several steps and the relation of one or more of such steps with respect to each of the others, and the article possessing the features, properties and the relation of elements, which are exemplified in the following detailed disclosure, and the scope of the invention will be indicated in the claims.

DETAILED DESCRIPTION OF THE PREFERRED EMBODIMENTS

The optical quality of the silica glass articles prepared in accordance with the invention is sufficiently high to enable the articles to be used as photomask substrates and as preforms for optical fibers. This is accomplished by introducing a heat treatment step to known sol-gel methods of preparing silica glass articles. The ability to mass produce and mold improved silica glass articles is also improved.

One of the advantages of sol-gel methods is that high melting point glass can be synthesized at low temperatures. Generally, temperatures less than about 1200° C. can be used. Thus, the method can be carried out relatively easily. In contrast, when silica glass is manufactured by fusing methods, temperatures above 1700° C. are necessary and it is difficult to perform the necessary manufacturing steps at this elevated temperature.

When using sol-gel methods, the vitrification temperature of the glass depends upon the components of the starting sol solution. For example, when a silicon alkoxide is hydrolyzed with an acid reagent, the vitrification temperature is about 900° C. When the silicon alkoxide is hydrolyzed with a basic reagent, the vitrification temperature increases to about 1200° C. When the starting sol solution is prepared by hydrolyzing silicon alkoxide with an acid reagent and mixing fine particle silica obtained by hydrolyzing silicon alkoxide with a basic reagent or ultrafine particle silica into the acid hydrolyzed silicon alkoxide, the vitrification temperature depends upon the mixing ratio, but is generally less than about 1400° C. The vitrification temperature is highest when the sol solution includes ultrafine particle silica diffused into the solvent. Even in this case vitrification is completed at temperatures less than about 1470° C.

As can be seen, silica glass manufactured by sol-gel methods requires less energy for manufacture than silica glass manufactured by fusing methods. However, when silica glass is made by these sol-gel methods, some inclusions, defects and the like arise independently of the components of the sol solution. These inclusions, defects and the like include:

1. Inorganic matter such as dust which becomes mixed into the material and the sol solution;
2. Defects produced by burning out organic inclusions;
3. Microcracks which occur at the time of shrinking;
4. Bubbles which occur at the time of gellation or which are produced during the sintering step;
5. Silica crystals which are produced during the sintering step and are mainly in the form of crystallite; and
6. Silica coagulated materials which are insufficiently sintered.

The present application relates to the introduction of a heat treatment step as the final step of the sol-gel method. Specifically, the glass article or glass article precursor obtained by conventional sol-gel methods is heated to a temperature close to the melting point of silica. This temporarily puts the glass article or the glass article precursor into a state of partial fusion. Accordingly, silica crystals and silica coagulated materials disappear because the temperature is higher than the melting point of the silica. Even if the temperature is lower than the fusion temperature, silica glass articles that are nearly uniform are produced. Defects produced by burning out organic inclusions, microcracks and bubbles disappear during the sintering process if the dry gel is heated to high temperatures after pores in the dry gel are closed under a helium atmosphere or under reduced pressure.

Small particles of inorganic matter disappear when the heat treatment is at a temperature higher than the melting point of silica, because the interface of the inorganic matter and the silica glass disappears. Accordingly, the glass becomes uniform. However, when extremely large particles of inorganic materials, which are hard to vitrify, are included, the quality of the glass deteriorates and is not completely uniform. Accordingly, it is desirable to remove particles larger than a few microns by performing the sol processing in a clean environment and by filtration or centrifugal separation of the sol solution.

The melting point of silica is 1713° C. If this temperature or a higher temperature is maintained during the heat treatment step of the manufacturing process, high quality silica glass is assured. Improvements in quality and beneficial effects are observed beginning at temperatures greater than about 1500° C. Accordingly, the appropriate temperature of high temperature treatment is greater than about 1500° C. and is determined by the quality of the glass articles required, the consumption energy and furnace ability. Preferably, the temperature is at least about 1600° C. Since temperatures which are too high cause violent vaporization of the silica, the upper limit of temperature is about 2200° C.

The method of preparing high quality silica glass in which the glass article or glass article precursor is heated to a selected temperature between about 1500° C. and 2200° C. and maintained at this temperature for a predetermined period of time can be used regardless of the components of the sol solution. Generally, the time varies depending on the specific temperature, sol-gel and type of glass article produced and does not significantly affect the purity of the glass article. However, the glass article should be maintained at the selected temperature for at least 10 seconds or as long as 5 hours, and more preferably between about 10 seconds and 30 minutes. The exact period is not critical, but must be long enough to remove silica crystals, inclusions, microcracks and bubbles. The disadvantages of maintaining the glass at the selected temperature for too long a period of time are that both manufacturing costs and loss of the fusing material as a result of evaporation increase.

Furthermore, unless the pores in the dry gel are closed by one of the following methods, the pores become large bubbles in the silica glass article. Thus, the heat treatment step is utilized in combination with the step of closing pores by one of the following methods:

1. Sintering and closing pores in the dry gel under helium atmosphere;
2. Sintering and closing pores in the dry gel under reduced pressure; and
3. Sintering and closing pores in the dry gel under reduced pressure following processing of the dry gel under helium atmosphere.

When the pores are closed in the dry gel, it is not always necessary to vitrify the gel completely, but such vitrification is permissible if a translucent glass precursor is obtained. There are several alternative procedures for heating a glass or glass precursor to a selected temperature between 1500° C. and 2200° C. after the pores in the dry gel are closed. For example, use of a gas burner of hydrogen, acetylene and the like is well known in the prior art. Gas burners are readily available and their operation is relatively simple. However, such gas burners are disadvantageous in that temperature control is extremely difficult and there is a large temperature differential between the surface and the inside of the glass article. Furthermore, this method is not suitable for mass production of glass articles.

As another example, methods using a high temperature furnace in which graphite, tungsten, molybdenum and the like is used as a heating element are also well known. These furnaces are very expensive and their operation is difficult. For example, the furnace must be used in an oxygen free atmosphere. On the other hand, accurate temperature control is assured and high quality silica glass articles can be manufactured with good yield. Additionally, the high temperature furnace can also be used as a high temperature continuous heat-treating furnace by combining these devices. Such a combination is extremely advantageous from the point of view of mass production.

In addition to these procedures, a high temperature gas oven in which hydrogen or hydrocarbon gas is used as a heat source for combustion is common.

When a silica glass article is to be used as a photomask substrate, a large square of glass is required. Generally, a square should be $5 \times 5 \times 0.9$ inches or, alternatively, $6 \times 6 \times 0.12$ inches and must be of stable quality. In order to satisfy both of these requirements, the procedure using a high temperature furnace having a graphite, tungsten or molybdenum heating element is suitable. However, since the samples are treated until they reach a partially fused state, they become welded to the furnace material. This causes cracks and transformation. Accordingly, it is necessary to provide an isolating layer between the furnace material and the samples.

A carbon material is extremely chemically stable in an inert atsmosphere and will not react with the silica glass. Accordingly, silica glass materials of high purity can be obtained, using an isolating layer of carbon powder or fibers between the furnace and the glass article. The difference in the expansion coefficient of the samples and the furnace material is compensated by displacement of the isolating layer. In this manner, cracks and transformations are prevented. Even though a portion of the isolating layer of carbon powder or carbon fiber may adhered to the sample, this layer is easily removed by washing or burning. When carbon is processed to a paper-like or fabric-like shape and used as the isolating layer, the handling becomes even easier and the contact surface becomes better. When isolating layers are provided between samples space the samples from each other, the same effect is obtained and space in the furnace is efficiently utilized, thereby enhancing mass productivity.

When a high temperature furnace in which tungsten or molybdenum is used as a heating element, carbon in the furnace tends to carbonize and deteriorate the heating element. In such a case, powders which are hard to sinter are suitable and can be used. Such powders include alumina, zirconia, silicon nitride and the like for use as the isolating layer. However, if the powder adheres to the sample it is difficult to remove.

When a glass article or glass article precursor is heated to a selected temperature between about 1500° and 2200° C., the sample becomes soft and is easily transformed. One of the advantages of the sol-gel method is the relative ease of molding at the time of gelation. One of the features of the high temperature treatment is that it is possible to mold the gel during this step. For example, when a large square silica glass plate is to be manufactured, a flat shape is not always maintained during vitrification even if the article is cast as a flat plate at the time of gelation. However, when the sample is placed on a furnace plate having a flat surface and heated to a high temperature, the sample is flattened under its own weight. Therefore, the method is advantageous for preparing the article for the subsequent grinding step.

If the glass is cast in a desired configuration in the furnace, whether the desired configuration is flat or not, extremely precise molding can be realized. Additionally, pressure can be applied to the samples using a press device in the furnace instead of depending upon the weight of the sample.

When a silica glass rod or tube is to be manufactured, it is more efficient to use a ring burner or ring heater. When the center portion of the rod or tube is heated to the selected high temperature while both ends of the rod or tube are fixed, the tension applied to the ends straightens the rod or tube. This is a significant procedure when the glass article obtained is to be used as a preform or support tube of an optical fiber.

When a glass article or glass article precursor is heated to a selected temperature between 1500° and 2200° C. and cooled rapidly, internal stresses remain in the silica glass. Therefore, rapidly cooling the glass after the high temperature treatment or, alternatively, gradually cooling after annealing following rapid cooling is necessary. Therefore, at least one step of cooling the material gradually from 1200° C. to room temperature should be included in the manufacturing process.

The high temperature treatment in accordance with the invention is fundamentally different from the fusion method of making silica glass. The differences between the present invention and the fusing method are as follows:

1. The bulk of the silica glass has previously been molded by sol-gel methods that are known in the art, prior to the high temperature treatment;

2. The high temperature treatment is shorter compared to the high temperature treatment required by the fusion method; and 3. No work is required at the time of high temperature treatment according to the method of the invention.

Conceptually, the high temperature heat treatment is similar to an annealing treatment to remove strain in the glass and is considered as a step for removing inclusions. As discussed above, according to the invention, improved silica glass of high quality and moldability which cannot be manufactured by prior art sol-gel methods is provided. Additionally, such silica glass is provided at lower cost than can be realized using prior art methods.

In addition, multi-component series glasses of high quality and low cost can be obtained using the method of the invention. Such multi-component series glasses include, for example, alkali-proof glasses of silicon dioxide-zinc dioxide series and low thermal expansion coefficient glasses of silicon dioxide-titanium dioxide series.

Further, optical high quality silica glass which can be used as photomask substrates and preforms for optical fibers can be supplied in large quantities at low cost can be prepared in accordance with the invention.

The invention can be better understood with reference to the following examples. These examples are presented for purposes of illustration only and are not intended in a limiting sense.

EXAMPLE 1

440 ml of silicon ethoxide and 360 ml of 0.05 normal hydrochloric acid solution were mixed and stirred violently to yield a uniform water-like transparent solution. The pH of the solution was adjusted to 4.2 using 0.1 normal ammonia water. This solution was filtered through a filter having a 1 micron mesh. 500 ml of the solution was poured into a polypropylene container having dimensions of 20 cm×20 cm×10 cm. The solution was gelled and dried for 10 days at 60° C. in the container, which was covered with a lid having openings amounting to 0.5% of the surface area of the lid. A transparent dry gel was obtained.

The dry gel was placed in a gas displacement furnace and the temperature was raised to 700° C. at a heating rate of 30° C. per hour. When the temperature reached 700° C., pure helium gas was allowed to flow into the furnace at a rate of 1 l/min. The temperature was raised to 900° C. at a heating rate of 10° C. per hour and the dry gel was maintained at 900° C. for one hour. As a result, the dry gel became clear glass having a specific gravity of 2.20. The size of the glass article was 8 cm×8 cm×0.5 cm. A minimal amount of inclusions having diameters of a few microns were detected.

An oxygen-hydrogen flame was applied to both sides of the silica glass article using a gas burner. When the temperature of the surface exceeded about 1800° C., the silica glass was maintained for a period longer than about 10 seconds and the surface was heated until it reached a nearly uniform condition. As a result, no inclusions were detected by a microscope at a magnification of 100 times, although the entire surface did exhibit distortions. The silica glass was maintained at a temperature of 1200° C. for one hour and then the temperature was lowered at a cooling rate of 100° C. per hour in order to remove distortions. The silica glass was mirror-polished into a glass having a thickness of 2 mm. Light from a condensed lamp was radiated onto the glass at an illumination of 50,000 lux in a dark room. No light point was seen.

EXAMPLE 2

440 ml of silicon ethoxide, 900 ml of ethanol and 360 ml of 0.1 normal ammonia water were uniformly mixed and maintained for one day at room temperature. The resulting emulsion sol solution was concentrated to 440 ml in total volume using a rotary evaporator. The sol solution was filtered using a filter having a 1 micron mesh and 440 ml of the solution was poured into a tubular polypropylene container having dimensions of 5 cm inner diameter by 30 cm length. The container had a lid having openings amounting to 2% of the surface area of the lid. The solution was dried at 60° C. for 10 days and a white dry gel was obtained.

The dry gel was placed in a vacuum furnace and the temperature was raised to 900° C. at a heating rate of 60° C. per hour. Atmospheric pressure in the vacuum oven was lowered to less than 1 Torr using a rotary pump. While the pressure was maintained, the temperature was raised to 1200° C. at a heating rate of 100° C. per hour. Vitrification of the dry gel occurred after the dry gel had been maintained at the temperature of 1200° C. for one hour. The specific gravity of the vitrified dry gel was 2.20, the diameter was 2.5 cm and the length was 10 cm. When the silica glass rod was exposed to irradiation by laser light having a wavelength of 0.633 μm, scattering was observed in all directions.

The rod was fixed on a glass lathe and heated with an oxygen-hydrogen flame while it was being rotated. When the surface temperature exceeded about 2000° C., the rod was maintained for a period greater than about 30 seconds. The rod was heated uniformly while the burner was moved along the length of the rod. When the silica glass rod was irradiated using laser light for a second time, no scattering was observed.

EXAMPLE 3

440 ml of silicon ethoxide, 900 ml of ethanol and 360 ml of 0.1 normal ammonia water were uniformly mixed and maintained at room temperature for one day. The resulting emulsion sol solution was concentrated to 440 ml in total volume using a rotary evaporator and the pH was adjusted to 4.0 using 1 normal hydrochloric acid solution.

In a separate operation, a uniform water-like transparent solution was obtained by violently stirring a mixture of 440 ml silicon ethoxide and 360 ml of 0.05 normal hydrochloric acid solution. The solution was mixed with the sol solution until a uniform mixture was obtained and the resulting solution was then filtered using a filter having a 1 micron mesh. The pH of this solution was adjusted to 4.8 using 0.1 normal ammonia water and 1000 ml of the resulting solution was poured into a tubular Teflon container having dimensions of 6 cm inner diameter and 40 cm length. The container was sealed with a stopper. After the sol was placed in the container the container was set on a revolving device and, using a revolving shaft, the container was rotated around the center axis of the tube at a rate of 500 rpm for one hour. The resulting gel was maintained at rest for 2 days.

The stopper was removed and the dry gel was placed into a second polypropylene container having dimensions of 10 cm×45 cm×15 cm. The second container was covered with a lid having openings amounting to 1% of the surface area of the lid. The dry gel was dried at 60° C. for 10 days and a tubular dry gel was obtained.

The dry gel was placed in a vacuum furnace and heated to 800° C. at a heating rate of 60° C. per hour. Atmospheric pressure in the vacuum furnace was lowered to less than 1 Torr at the temperature of 800° C. and pure helium gas was passed over the gel in the furnace at a rate of 1 l/min.

Atmospheric pressure in the vacuum oven was lowered to less than 1 Torr for a second time and while this pressure was maintained, the temperature in the oven was raised to 1200° C. at a heating rate of 100° C. per hour. The dry gel was vitrified after it had been maintained at a temperature of 1200° C. for one hour. The specific gravity of the vitrified dry gel was 2.20, the outer diameter was 3 cm, inner diameter was 1 cm and length was 20 cm. The tubular silica glass article was exposed to irradiation by laser light having a wavelength of 0.63 μm and light scattering was observed in all directions.

The silica glass tube was placed vertically into a graphite heating furnace and the atmosphere in the furnace was changed to nitrogen gas. The temperature was raised to 1600° C. in two hours and maintained at 1600° C. for 10 minutes. The temperature was lowered to 1200° C. at a rate of 1000° C. per hour and then lowered to room temperature at a rate of 100° C. per hour. When the silica glass article was exposed to irradiation by laser light a second time, only minimal scattering was observed.

EXAMPLE 4

440 ml of silicon ethoxide and 360 ml of 0.05 normal hydrochloric acid solution were mixed and stirred violently to obtain a uniform water-like transparent solution. 150 g of ultrafine particle silica (Aerosil OX-50) was added slowly to the uniform transparent solution and the solution was stirred. The sol solution was exposed to irradiation by ultrasonic waves having a wavelength of 28 KHz for 2 hours at a temperature of 20° C. Then centrifugal force of 1500 G was applied for 10 minutes in order to remove large silica particles. The sol solution was filtered using a filter having a 1 micron mesh.

The pH of the highly homogeneous sol solution was adjusted to 4.2 using 0.1 normal ammonia water. 500 ml of the resulting solution was poured into a polypropylene container having dimensions of 20 cm×20 cm×10 cm. The container had a lid having openings amounting to 1% of the surface area of the lid. The sol solution was dried at 60° C. for 7 days and a white porous dry gel was obtained.

The dry gel was placed in a gas displacement furnace and heated to 1000° C. at a heating rate of 60° C. per hour. When the temperature reached 1000° C., pure helium was introduced into the furnace at a rate of 1 l/min and the dry gel was heated to 1300° C. at a rate of 30° C. per hour. The dry gel was maintained at 1300° C. for one hour in order to complete vitrification of the dry gel. The vitrified dry gel had a specific gravity of 2.20 and a size of 10 cm×10 cm×0.5 cm. Inclusions and crystallite-type crystals having a diameter of about 10 microns were detected in small amounts.

Carbon powder was laid on a graphite plate having dimensions of 15 cm×15 cm×1 cm to a thickness of 1 mm. The silica glass plate was laminated on the carbon powder and placed in the graphite heating furnace. The furnace atmosphere was substituted with nitrogen gas and the temperature was raised to 1800° C. for 2 hours. The temperature of 1800° C. was maintained for 10 minutes. The temperature was lowered to 1200° C. at a cooling rate of 1000° C. per hour and then lowered to room temperature at a cooling rate of 100° C. per hour.

No fusion occurred between the graphite and the silica glass plate and the flatness of the silica glass article obtained was determined to be very good. The term "flatness" refers to the degree of warp and distortion of the silica glass plate, i.e. how flat the plate surface is. When the warp or distortion is visible to the naked eye, it can be measured using a microgage. If the warp or distortion is not visible to the naked eye, it can be measured by optical methods such as counting the number of Newton rings.

The silica glass article was mirror-polished into a plate of 2 mm thickness and condensed lamp light was applied at an intensity of illumination of 50,000 lux in a dark room. No light points were detected. Optically, the silica glass was very high quality and no crystals or distortions were observed.

EXAMPLE 5

250 g of ultrafine particle silica (Aerosil 200) was scattered into 500 ml of pure water and the solution was exposed to irradiation by ultrasonic waves having a wavelength of 28 KHz for 2 hours at a temperature of 20° C. 400 ml of the slurry having a high viscosity was poured into a polypropylene container having dimensions of 5 cm inner diameter and 30 cm depth. The container had a lid with openings amounting to 2% of the surface area of the lid. The slurry was dried at 60° C. for 10 days and a white porous dry gel was obtained.

The dry gel was placed into a gas displacement furnace and heated to 1100° C. at a rate of 60° C. per hour. When the temperature reached 1100° C., pure helium gas was introduced into the furnace at a flow rate of 1 l/min and the dry gel was heated to 1400° C. at a rate of 30° C. per hour. The dry gel was maintained at 1400° C. for one hour and translucent silica glass having a specific gravity of 2.20 was obtained.

The silica glass rod precursor was vertically placed into a high temperature gas furnace and heated to 1800° C. using a propane gas flame. The temperature of 1800° C. was maintained for 10 minutes. Then the temperature was lowered to 1200° C. at a rate of 1000° C. per hour and then lowered to room temperature at a rate of 100° C. per hour.

A transparent silica glass rod was obtained without bubbling. The diameter of the rod was 4 cm and the length was 24 cm. The transparent silica glass rod was exposed to irradiation by laser light having a wavelength of 0.63 μm and no light scattering was observed.

EXAMPLE 6

Zirconia powder was laid on a tungsten plate having dimension of 15 cm×15 cm×0.2 cm to a thickness of 1 mm. A silica glass plate obtained by closing pores in the dry gel according to the method of Example 1 was laminated on the zirconia powder and placed in a tungsten heating furnace. The furnace atmosphere was changed to nitrogen gas and the temperature was raised to 1800° C. in 2 hours and maintained at 1800° C. for 10 minutes. The temperature was lowered to 1200° C. at a cooling rate of 1000° C. per hour and then lowered to room temperature at a cooling rate of 100° C. per hour.

The tungsten plate was not fused to the silica glass plate and the flatness of the silica glass was determined to be very good. The silica glass was mirror-polished into a plate of 2 mm thickness and condensed lamp light was applied at an intensity of illumination of 50,000 lux in a dark room. No light points were detected. Optically, very high quality silica glass was obtained and no crystals or distortion were observed.

EXAMPLE 7

1760 ml of silicon ethoxide, 2690 ml of ethanol and 670 ml of 1 normal ammonia water were uniformly mixed and maintained for 5 days at room temperature. 400 ml of pure water was added to the resulting emulsion sol solution and the solution was concentrated to 1000 ml total volume using a rotary evaporator. The pH of the sol solution was adjusted to 4.0 by the addition of 2 normal hydrochloric acid solution.

Separately, a uniform water-like transparent solution was obtained by violently stirring a mixture of 760 ml of silicon ethoxide and 250 ml of 0.02 normal hydrochloric acid solution. The resulting solution was uniformly mixed with the sol solution and filtered using a filter having a 1 micron mesh. The pH of the solution was adjusted to 4.2 using 0.1 normal ammonia water and centrifugal force of 1500 G was applied for 10 minutes to remove large silica particles. The solution was filtered again using a filter having a 1 micron mesh.

1100 ml of the sol solution having a high degree of homogeneity was poured into a polypropylene container having dimensions of 30 cm × 30 cm × 15 cm. The container had a lid with openings amounting to 0.5% of the surface area of the lid. When the sol solution was dried at 60° C. for 20 days a white porous dry gel having dimensions of 22 cm × 22 cm × 0.9 cm was obtained.

The resulting dry gel was placed into a gas displacement furnace and dry air flowed into the furnace at a rate of 2 l/min. The dry gel was heated to 700° C. at a rate of 60° C. per hour and maintained at 700° C. for 20 hours. Helium gas was substituted for the dry air in the furnace at a flow rate of 2 l/min. The dry gel was maintained for 10 hours each at 900°, 1000°, 1100° and 1200° C. When vitrification of the dry gel was completed, the size of the glass article was 5.5 cm × 15.5 cm × 0.6 cm and the flatness was 2 mm.

KUREHA carbon fiber paper having a thickness of 0.3 mm was laid on a graphite plate having dimensions of 20 cm × 20 cm × 1 cm. The silica glass plate was laminated on the carbon paper and placed in a graphite heating furnace. The furnace atmosphere was changed to nitrogen gas and the temperature was raised to 1850° C. in 2 hours and maintained at 1850° C. for 5 minutes. The temperature was lowered to 1200° C. at a cooling rate of 1000° C. per hour and then lowered to room temperature at a cooling rate of 100° C. per hour.

The graphite plate was not fused to the silica glass plate and the flatness of the silica glass was 0.1 mm or less. The silica glass plate was mirror-polished into a plate of 6 inches × 6 inches × 0.12 inches. Condensed lamp light was applied to the mirror-polished plate at an intensity of illumination of 50,000 lux in a dark room. No light points were detected. When the transmittance of ultraviolet light having a wavelength of 200 nm or greater was measured, it was consistently greater than or equal to 90% and no specific absorption was observed.

EXAMPLE 8

1150 ml of silicon ethoxide and 620 ml of 0.01 normal hydrochloric acid solution were mixed and stirred violently to obtain a water-like transparent uniform solution. 300 g of ultrafine particle silica (Reolosil QS-102) was added slowly to the solution with stirring. The sol solution was exposed to irradiation by ultrasonic waves of 28 KHz for 2 hours at a temperature of 20° C. Then a centrifugal force of 1500 G was applied for 10 minutes in order to remove large silica particles. The solution was filtered using a filter having a 1 micron mesh. The pH of the resulting solution was adjusted to 4.2 using 0.1 normal ammonia water and centrifugal force of 1500 G was again applied for 10 minutes. The sol solution was filtered a second time using a filter having a 1 micron mesh.

1100 ml of the sol solution having a high degree of homogeneity was poured into a polypropylene container having dimensions of 30 cm × 30 cm × 15 cm. The container had a lid with openings amounting to 0.5% of the surface area of the lid. When the sol solution was dried at 60° C. for 20 days a white porous dry gel was obtained.

The dry gel was placed in a gas displacement furnace and dry air was flowed into the furnace at a rate of 2 l/min. The dry gel was heated to 200° C. at a rate of 60° C. per hour and maintained for three hours, then to 300° C. at a rate of 60° C. per hour and maintained for 3 hours, then to 500° C. at a rate of 60° C. per hour and maintained for 3 hours and then to 700° C. at a rate of 60° C. per hour. The dry air flowing through the furnace was replaced by helium gas at a rate of 2 l/min. The resulting dry gel was maintained for 10 hours each at 700°, 900°, 1000°, 1100° and 1200°. The dry gel was completely vitrified and the specific gravity was 2.20.

Carbon paper having a thickness of 0.3 mm was laid on a graphite plate having dimensions of 20 cm × 20 cm × 1 cm. The silica glass plate was laminated on the carbon paper and moved into a graphite heating furnace maintained at a temperature of 1800° C. After the silica glass plated was maintained at 1800° C. for 10 minutes, it was moved into a cold chamber and chilled to room temperature in 30 minutes. Distortions were found in the silica glass plate. The plate was heated to 1200° C. and maintained at 1200° C. for one hour. The temperature was lowered at a rate of 100° C. per hour in order to remove the distortion. The flatness of the plate was determined to be less than 0.1 mm.

The silica glass was mirror-polished to a plate of 6 inches × 6 inches × 0.12 inches and condensed lamp light was applied at an intensity of illumination of 50,000 lux in a dark room. No light points were detected. The transmittance of ultraviolet light was measured at a wavelength of 200 nm or less and was found to be consistently 85% or greater. No specific absorption was observed.

EXAMPLE 9

A white porous dry gel having dimensions of 22 cm × 22 cm × 0.9 cm was obtained using the method described in Example 7 and was placed in a gas displacement furnace. Dry air flowed through the furnace as a rate of 2 l/min. The temperature in the furnace was raised to 700° C. at a rate of 60° C. per hour and maintained at 700° C. for 20 hours. The dry air in this furnace was substituted with helium gas flowing into the furnace at a rate of 2 l/min. The temperature in the furnace was maintained for 5 hours each at 800°, 900° and 1000°. The temperature was lowered to room temperature and a white porous dry gel having dimensions of 18 cm × 18 cm × 0.7 cm was obtained.

Carbon paper having a thickness of 0.3 mm was laid on a graphite plate having dimensions of 20 cm × 20 cm × 1 cm. The sintered gel was laminated on the carbon paper and placed in the graphite heating furnace. Pressure was reduced to less than 1 Torr using a rotary pump and the temperature was raised to 1000° C. in 10 minutes. The temperature was then raised to 1300° C. at a heating rate of 300° C. per hour and maintained at 1300° C. for one hour. At 1300° C., nitrogen gas continuously flowed through the furnace. The temperature was raised to 1750° C. at a heating rate of 600° C. per hour and maintained at 1750° C. for 30 minutes.

The resulting glass was moved into a cold chamber and chilled to room temperature in 30 minutes. A transparent silica glass article having a size of 15.5 cm × 15.5 cm × 0.6 cm was obtained and no fractures or cracks were observed in the silica glass plate. However, distortions were observed. The silica glass plate was heated to 1200° C. and maintained at 1200° C. for one hour. The temperature was lowered at a rate of 100° C. per hour in order to remove the distortions.

The resulting silica glass plate was mirror-polished into a plate of 6 inches×6 inches×0.12 inches and condensed lamp light was applied at an intensity of illumination of 50,000 lux in a dark room. No light points were detected. Optically, very high quality silica glass was obtained without crystals or distortion. When the transmittance of ultraviolet light was measured for wavelengths of 200 nm or greater, the transmittance was consistently 90% or greater and no specific absorption was observed.

EXAMPLE 10

Twenty silica glass articles having dimensions of 15.5 cm×15.5 cm×0.6 cm obtained by closing pores in the dry gel under helium atmosphere as described in Example 7 were prepared. Five pieces of carbon paper having dimensions of 17 cm×17 cm×0.03 cm and 5 of the silica glass articles were alternately laminated on a graphite plate having dimensions of 20 cm×20 cm×1 cm. The graphite plate was laid on 4 graphite props at a height of 4 cm. Additionally, another 5 silica glass articles and 5 pieces of carbon paper were alternately laminated as described. In all, 20 silica glass articles were set up in this manner. After the furnace atmosphere was substituted with nitrogen gas, the laminated glass articles and carbon paper were moved into a graphite heating furnace at a temperature of 1800° C. and maintained at 1800° C. for 15 minutes. The samples were then moved into a cold chamber and chilled to room temperature in 30 minutes. There was no fusion between the graphite plates and the silica glass articles or between the silica glass articles. The flatness of the silica glass articles was less than 0.2 mm. However, since distortions were found in the glass articles, the articles were heated to 1200° C. and maintained at 1200° C. for one hour. The temperature was lowered at a rate of 100° C. per hour in order to remove the distortion.

The resulting silica glass articles were mirror-polished into plates of 6 inches×6 inches×0.2 inches and condensed lamp light was applied at an intensity of illumination of 50,000 lux in a dark room. No light points were detected. Optically, very high quality silica glass was obtained without crystals or distortion. The transmittance of ultraviolet light was measured at wavelengths of 200 nm or greater and was consistently determined to be 90% or greater. No absorption was observed.

EXAMPLE 11

2200 ml of silicon ethoxide and 1600 ml of 0.02 normal hydrochloric acid solution were mixed and stirred violently to obtain a water-like transparent uniform solution. 600 g of ultrafine particle silica (Aerosil OX-50) was slowly added to the solution with stirring until a uniform sol solution was obtained. The sol solution was exposed to irradiation by ultrasonic waves having a wavelength of 28 KHz for 2 hours at a temperature of 20° C. Then centrifugal force of 1500 G was applied for 10 minutes in order to remove large particle silica. The sol solution was filtered using a filter having a 1 micron mesh. The pH of the solution was adjusted to 4.8 using 0.1 normal ammonia water and the sol solution was filtered again using a filter having a 1 micron mesh.

3770 ml of the highly homogeneous sol solution was poured into a tubular container having dimensions of 6 cm inner diameter and 150 cm length. The tubular container was constructed of aluminum covered with Teflon and was sealed with a stopper. The container was positioned on a revolving device and rotated around the center axis of the tube using a revolving shaft rotating at a rate of 500 rpm for one hour. The sol in the tubular container was then maintained at rest for 4 days at room temperature. The stopper was removed and the tubular gel was transferred to a polypropylene container having dimensions of 10 cm×170 cm×20 cm. A lid having openings amounting to 0.5% of the surface area of the lid was used to cover the container and the gel was dried at 60° C. for 30 days. A tubular dry gel was obtained.

The tubular dry gel was placed into a gas displacement furnace and dry air was flowed through the furnace at a rate of 2 l/min. The temperature in the furnace was raised to 700° C. at a heating rate of 60° C. per hour. The dry gel was maintained at 700° C. for 10 hours. A mixture gas of helim flowing at a rate of 1.8 l/min and chlorine flowing at a rate of 0.2 l/min was used to replace the dry air. The temperature in the oven was raised to 1000° C. at a rate of 30° C. per hour. Then oxygen gas flowing at a rate of 2 l/min was used to replace the mixture gas. The dry gel was maintained at a temperature of 1000° C. for 10 hours and then the temperature was raised to 1050° C. for another 10 hours.

Finally, helium gas flowing at a rate of 2 l/min was used to replace the oxygen gas in the furnace and the dry gel was maintained for 10 hours each at temperatures of 1050°, 1100° and 1200° C. The resulting silica glass was translucent and the specific gravity was almost 2.20. The outer diameter of the tubular silica glass was 3 cm, the inner diameter was 1 cm and the length was 75 cm. The ovality of the silica glass was 0.1% and the bow was 2.0 mm/m.

The silica glass precursor was fixed at both ends in a vertical position and moved into a ring heater having a graphite heating element. The temperature of the ring heater was maintained at 2000° C. while argon gas flowed around the heater. The silica glass precursor was moved in such a way that the upper end moved at a rate of 3 cm/min and the lower end moved at a rate of 4 cm/min in the vertical direction. Then the resulting silica glass was placed into an electric oven and maintained for one hour at a temperature of 1200° C. The temperature was lowered at a cooling rate of 100° C. per hour in order to remove distortions. The outer diameter of the glass tube was 2.6 cm, the inner diameter was 0.87 cm and the length was 1 m. The ovality was 0.1% and the bow was improved to 0.1 mm/m.

When the silica glass tube was exposed to irradiation by laser light having a wavelength of 0.63 μm, no scattering was observed. The water content was measured by the absorption of laser light at a wavelength of 2.72 μm and was determined to be less than 1 ppm.

EXAMPLE 12

440 ml of silicon ethoxide and 360 ml of 0.05 normal hydrochloric acid solution were mixed and stirred violently to yield a water-like transparent uniform solution. 150 g of ultrafine particle silica (Aerosil OX-50) was slowly added to the transparent uniform solution with stirring until the solution was uniformly mixed and a sol solution was obtained. The sol solution was exposed to irradiation by ultrasonic waves at a wavelength of 28 KHz for 2 hours at a temperature of 20° C. Centrifugal force of 1500 G was applied for 10 minutes in order to remove large particles of silica. The sol solution was filtered using a filter having a 1 micron mesh.

The pH of the highly homogeneous sol solution was adjusted to 4.2 with 0.1 normal ammonia water. 700 ml of the solution was poured into a tubular polypropylene container having dimensions of 30 cm inner diameter and 10 cm length. The container had a lid with openings amounting to 1% of the surface area of the lid. When the sol solution was gelled and dried at 60° C. for 7 days, a white porous dry gel was obtained.

The dry gel was placed into a vacuum furnace and the temperature was raised to 1000° C. at a rate of 60° C. per hour. The atmospheric pressure in the vacuum furnace was lowered to less than 1 Torr using a rotary pump and while the reduced pressure was maintained, the temperature was raised to 1300° C. at a rate of 100° C. per hour. After the dry gel had been maintained at the temperature of 1300° C. for one hour, vitrification occurred. The diameter and thickness of the vitrified dry gel were 15 cm and 0.5 cm, respectively.

The silica glass plate was laid on a graphite instrument having concave type curves with a curvature radius of 30 cm. The graphite instrument was placed in a graphite heating furnace, the furnace atmosphere was replaced with nitrogen gas and the temperature was raised to 1800° C. for 2 hours. The temperature was maintained at 1800° C. for 10 minutes, and then lowered to 1200° C. at a cooling rate of 1000° C. per hour. The temperature was lowered further to room temperature at a cooling rate of 100° C. per hour. A uniform silica glass having a watch-glass-like shape was obtained. There was no bubbling and the silica glass obtained was of optically high quality.

EXAMPLE 13

A silica glass plate having dimensions of 15 cm diameter×0.5 cm thickness was sintered in a vacuum furnace as described in Example 12. The plate was set between graphite instruments in order to yield a crucible shaped casting. Then the sample was placed into a graphite heating furnace having a hot press mechanism. After the furnace atmosphere was substituted with nitrogen gas, the temperature was raised to 1850° C. in 2 hours and maintained for 5 minutes. The glass was pressed at a pressure of 10 kg/cm through the graphite instrument and then the temperature was lowered to 1200° C. at a rate of 1000° C. per hour. The temperature was lowered further to room temperature at a rate of 100° C. per hour.

An extremely high quality silica glass article having a crucible shape was obtained.

EXAMPLE 14

A silica glass article having dimensions of 15.5 cm×15.5 cm×0.6 cm obtained by closing pores in the dry gel under helium atmosphere according to the method described in Example 7 was placed into an electric furnace and maintained at 1600° C. for 30 minutes. The temperature was lowered to 1200° C. at a cooling rate of 1000° C. per hour and then lowered to room temperature at a cooling rate of 100° C. per hour.

The resulting silica glass plate was mirror-polished into a plate of 6 inches×6 inches×0.12 inches and condensed lamp light was applied at an intensity of illumination of 50,000 lux in a dark room. Very light light spots were observed. Small light points were detected with the naked eye in the surface of the glass plate.

EXAMPLE 15

A silica glass plate having dimensions of 15.5 cm×15.5 cm×0.6 cm obtained by closing pores in the dry gel under helium atmosphere according to the method described in Example 7 was placed in a graphite heating furnace. The furnace atmosphere was substituted with argon gas and the temperature was raised to 2100° C. in 2 hours and maintained at 2100° C. for one minute. The temperature was lowered to 1200° C. at a cooling rate of 1000° C. per hour and then lowered to room temperature at a cooling rate of 100° C. per hour.

The glass size was reduced to 14 cm×14 cm×0.5 cm due to silica vaporization. The silica glass was mirror-polished into a plate of 2 mm thickness and condensed lamp light was applied at an intensity of illumination of 50,000 lux in a dark room. No light points were detected.

COMPARATIVE EXAMPLE 1

Silica glass having dimensions of 15.5 cm×15.5 cm×0.6 cm obtained by closing pores in the dry gel under helium atmosphere according to the method described in Example 7 was placed in a furnace and maintained at a temperature of 1450° C. for 30 minutes. When the temperature was lowered to room temperature, the surface of the silica glass became white as a result of crystallization of the silica.

The resulting silica glass was mirror-polished into a plate of 6 inches×6 inches×0.12 inches and condensed lamp light was applied at an intensity of illumination of 50,000 lux in a dark room. Light spots appeared clearly. Various sized light points were exhibited in the glass.

COMPARATIVE EXAMPLE 2

A silica glass article having dimensions of 15.5 cm×15.5 cm×0.6 cm obtained by closing pores in the dry gel according to the method described in Example 7 was placed in a graphite heating furnace. The furnace atmosphere was substituted with argon gas and the temperature was rapidly raised to 2300° C. and then lowered to room temperature. Little silica glass was present in the oven.

COMPARATIVE EXAMPLE 3

A white porous dry gel obtained by drying according to the method described in Example 4 was heated to 1300° C. in an atmosphere such that transparent silica glass was obtained. The size of the silica glass was 10 cm×10 cm×0.5 cm. Inclusions having diameters of about 10 um and bubbles were detected. The silica glass was placed in a graphite heating furnace, the furnace atmosphere was substituted with nitrogen gas and a temperature of 1800° C. was maintained for 10 minutes. Since violent bubbling occurred in the silica glass, the glass volume swelled by three times.

As disclosed herein, the invention provides silica glass having improved optical quality. This is accomplished by heating the glass or glass precursor to a temperature between about 1500° C. and 2200° C. and maintaining the temperature for a predetermined period of time sufficient to remove silica crystals, inclusions, microcracks and bubbles.

When preparing glass in accordance with the invention, it is necessary to close pores in the dry gel under a helium atmosphere or at reduced pressure in order to prevent bubbling. However, the invention is effective regardless of the preparation method of the sol or the heating method used. Additionally, the method can be used with silica glass articles of various shapes.

The silica glass prepared in accordance with the invention can be used as silica substrates for integrated circuit (IC) masks, support tubes for optical communication fibers, mother rods for optical communication fibers and the like.

It will thus be seen that the objects set forth above, among those made apparent from the preceding description, are efficiently attained and, since certain changes may be made in the above article without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for preparing a silica glass article having a selected shape by the sol-gel method, comprising the steps of:
   preparing a silica containing sol solution by hydrolyzing silicon alkoxide and mixing the hydrolyzed silicon alkoxide with fine silica particles;
   gelling the sol solution to form a wet gel;
   drying the wet gel by maintaining the wet gel in a heated condition to form a dry gel;
   sintering the dry gel to close pores in the dry gel and form a silica glass article of a selected shape;
   heating the silica glass article to a selected temperature greater than about 1500° C. and up to about 2200° C.; and
   maintaining the silica glass article at the selected temperature while maintaining a glassy form for a predetermined period of time sufficient to remove silica, crystals, inclusions, micro-cracks and bubbles in the silica glass article and without substantially changing the shape of the glass article from the selected shape.

2. The method of claim 1, wherein the silica glass article is molded using a casting of the desired configuration when the article is heated to the selected temperature.

3. The method of claim 1, wherein the silica glass article is molded to the desired configuration by subjecting the article to an outside force when the article is heated to the selected temperature.

4. The method of claim 1, further comprising the steps of rapidly cooling the silica glass article from the selected temperature to about 1200° C. and gradually cooling the article from 1200° C. to room temperature in stages.

5. The method of claim 4, wherein the cooling rate is small in at least one of the stages.

6. The method of claim 1, wherein the sol solution is obtained by mixing a solution of silicon alkoxide hydrolyzed with an acid reagent and ultrafine particle silica at a predetermined mixing ratio.

7. The method of claim 1, wherein the sol solution is obtained by diffusing ultrafine particle silica into water at a predetermined mixing ratio.

8. The method of claim 1, wherein the sol solution is obtained by diffusing ultrafine particle silica into an organic solvent at a predetermined mixing ratio.

9. The method of claim 1, wherein pores in the dry gel are closed by sintering the dry gel in helium atmosphere.

10. The method of claim 1, wherein pores in the dry gel are closed by sintering the dry gel under reduced pressure.

11. The method of claim 1, wherein pores in the dry gel are closed by sintering the dry gel under reduced pressure and in helium atmosphere.

12. The method of claim 1, wherein the silica glass article is heated to the selected temperature using a gas burner.

13. The method of claim 12, wherein the gas burner uses a gas selected from the group consisting of hydrogen and acetylene.

14. The method of claim 1, wherein the silica glass article is heated to the selected temperature in a high temperature furnace.

15. The method of claim 14, wherein the high temperature furnace is a graphite furnace.

16. The method of claim 14, wherein the high temperature furnace is a tungsten furnace.

17. The method of claim 14, wherein the high temperature furnace is a molybdenum furnace.

18. The method of claim 14, wherein the high temperature furnace is a gas furnace.

19. The method of claim 18, wherein the gas furnace is a hydrogen gas furnace.

20. The method of claim 1, wherein the silicon alkoxide is silicon ethoxide.

21. The method of claim 1, where the article is treated to a temperature between about 1600° C. and 2200° C.

22. In a sol-tel method for preparing a silica glass article including the steps of preparing a silica containing sol solution by hydrolyzing silicon alkoxide and mixing the hydrolyzed silicon alkoxide with fine silica particles, gelling the sol solution to form a wet gel, drying the wet gel by maintaining the wet gel in a heated condition to form a dry gel and sintering the dry gel at a temperature effective to close pores in the gel and form the silica glass article, the improvement which comprises:
   heating the formed silica glass article to a selected temperature between at least above about 1500° C. and up to about 2200° C.; and
   maintaining the silica glass article at the selected temperature while maintaining a glassy form for a predetermined period of time sufficient to remove silica crystals, inclusions, microcracks and bubbles in the silica glass article.

23. The method of claim 1, wherein the predetermined period of time (t) at which the silica glass article is heated between about 1500° C. and 2200° C. is determined by the inequality:

$$\exp(4.0-T/400) \leq t \leq \exp(6.5-T/400)$$

wherein (1500° C. $\leq$ T $\leq$ 2200° C.); t is the time in minutes; and T is temperature give in °C.

24. The method of claim 23, wherein the predetermined period of time is determined by the inequality:

$$\exp(4.5-T/400) \leq t \leq \exp(6.3-T/400)$$

wherein 1600° C. $\leq$ T $\leq$ 2100° C.

25. The method of claim 1, wherein the wet gel is obtained by adjusting the pH of the sol solution in the acidic range by adding a base.

* * * * *